Jan. 27, 1970   W. H. RECK   3,491,880
FLOTATION APPARATUS AND PROCESS
Filed Dec. 7, 1967   2 Sheets-Sheet 1
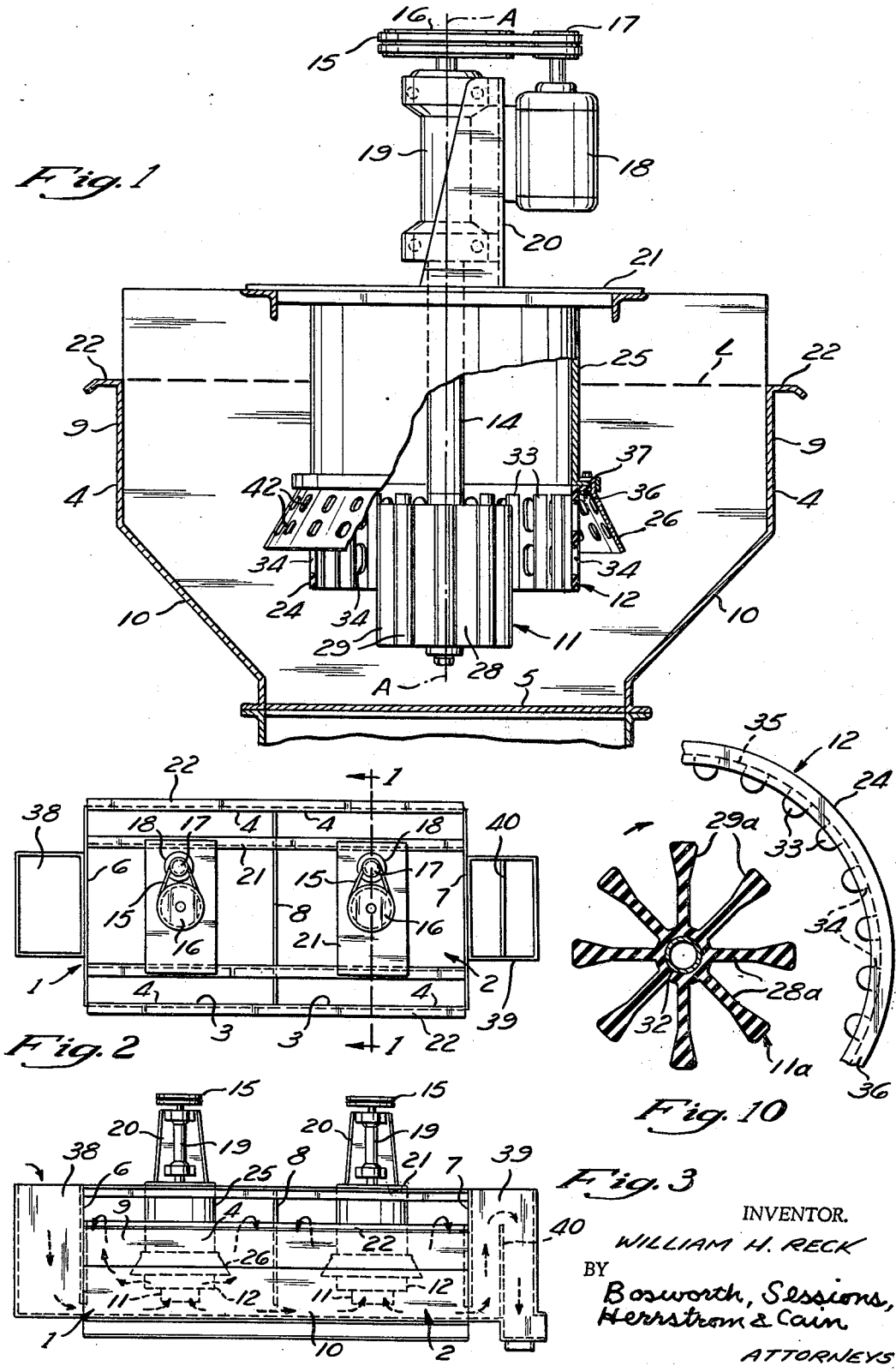
INVENTOR.
WILLIAM H. RECK
BY Bosworth, Sessions,
Herrstrom & Cain
ATTORNEYS Jan. 27, 1970　　　　　W. H. RECK　　　　　3,491,880
FLOTATION APPARATUS AND PROCESS
Filed Dec. 7, 1967　　　　　　　　　　　　　　2 Sheets-Sheet 2

INVENTOR.
WILLIAM H. RECK
BY
Bosworth, Sessions,
Herrstrom & Cain
ATTORNEYS

United States Patent Office 3,491,880
Patented Jan. 27, 1970

3,491,880
FLOTATION APPARATUS AND PROCESS
William H. Reck, Phoenix, Ariz., assignor to Arthur G. McKee Company, Cleveland, Ohio, a corporation of Delaware
Filed Dec. 7, 1967, Ser. No. 688,787
Int. Cl. B03d 1/14, 1/00
U.S. Cl. 209—164                               26 Claims

ABSTRACT OF THE DISCLOSURE

Aeration flotation apparatus comprising a rotor mounted in a tank for rotation about a generally upright axis and having vanes that extend generally radially from a central axial portion and that have transversely extending portions spaced from the axis, and stator means extending from a location substantially above the bottom of the rotor to a location above the level of the liquid in the tank and having spaced portions projecting inwardly toward the rotor with openings between the inwardly projecting portions. A process according to which bubbles of air are formed in a pulp and caused to flow radially in cyclonic paths about upwardly directed axes.

---

This invention relates to aeration apparatus and process and more particularly to aeration flotation apparatus embodying improved rotor means and improved stator means and to a method providing improved bubble flow patterns.

BACKGROUND OF THE INVENTION

While the invention may be employed in various types of aeration apparatus, it provides particular advantages in a flotation apparatus and process in which connection the invention will be hereinafter described.

Flotation apparatuses and processes for selectively separating finely divided particles heretofore have been widely used for separation of metallic or non-metallic minerals, and are even used in other industrial processes such as purification of foods, de-inking of paper pulp, or treating of industrial wastes.

In such an apparatus and process, the material to be treated is introduced into the tank of the flotation apparatus in the form of a pulp or slurry made up of a liquid containing particles of solid material to be separated and particles of solid material to be retained. A rotatable rotor operates in the pulp within stator means to produce in the pulp a multitude of minute bubbles that selectively attach themselves to the particles to be separated and provide buoyancy to raise them to the surface of the body of pulp in the flotation apparatus tank, where they are removed in a froth. Usually the particles of a desired material are floated to the surface and are removed with the froth. In some cases, however, particles of an undesired material are floated with the bubbles and removed leaving the desired material in the pulp.

The surface characteristics of the particles in the pulp determine whether they will become attached to bubbles on contact and be floated and removed, or remain in the pulp. To effect this attachment of particles to the bubbles, it is frequently necessary artificially to prepare or alter the surface characteristics of the particles to be separated by introducing certain known reagent materials into the pulp for this purpose; these reagent materials selectively coat the surfaces of certain particles and leave the others unaffected, thus facilitating the selective separation.

It has been found that for efficiency the flotation apparatus should effectively apply power to produce as large an amount as possible of bubble surface area or gas-liquid interface, and thus to provide the greatest number of possible contacts between these bubbles and the particles to be separated. In general, froth flotation apparatuses heretofore used have had serious disadvantages. Thus, prior apparatuses having reasonably high efficiency in general have been quite complicated in construction, being made of a large number of parts which must be assembled for operation, with consequent added costs of manufacture, and which must be disassembled for maintenance purposes. On the other hand, prior apparatuses of simpler construction or fewer parts in general have been deficient in efficiency.

Furthermore, prior forms of apparatus usually have caused problems when the pulp contains a substantial amount of relatively coarse particles. The coarse particles often cause congestion near the rotor that can cause excessively high start up loads on, or even breaking of, the rotor; furthermore, in operation, such coarse particles can cause excessive wear on the rotor. Moreover, even though only a portion of the rotor wears substantially while other portions remain relatively unworn, it has heretofore been necessary to discard the entire rotor because of wear with consequent economic loss. The close clearances between rotor and stator means characteristic of prior apparatus also often cause jamming or breakage of the rotor or stator means when the pulp contains excessively large particles such as debris that are unavoidable in certain cases.

Moreover, prior processes in general do not provide flow patterns that are as effective as desired in bringing the bubbles into contact with the particles to be separated, or in providing the desired flotation action.

SUMMARY OF INVENTION

An object of the present invention is to provide aeration apparatus and process overcoming the above difficulties and providing increased efficiency. Another object is the provision of a rotor that is of simple, rugged construction and that may be molded, in one piece if desired, of suitable material such as rubber-like material. Another object is the provision of a rotor having vanes that can desirably deflect under load. A further object is the provision of stator means of improved design that is simple and rugged in construction.

Another object is to provide aeration apparatus in which the rotor and stator means are disposed about a substantially upright axis, and in which the rotor projects substantially below the stator while clearing the bottom of the tank in which the rotor and stator are disposed. A further object is the provision of a rotor which may be changed end-for-end to equalize wear. Another object is the provision of aeration apparatus that may be economically manufactured. Another object is the provision of aeration apparatus in which there is a much larger clearance between the rotor and stator means than is characteristic of prior apparatus. Another object is the provision of a process for providing stable flow patterns in which the bubbles of air travel radially through the pulp in upward cyclonic paths.

DESCRIPTION OF DRAWINGS

These and other objects and advantages of the invention will be apparent from the following description of two preferred embodiments in connection with the accompanying drawings in which:

FIGURE 1 is a sectional elevation of a flotation apparatus embodying the invention, along line 1—1 of, and to a larger scale than, FIGURE 2, parts of the stator means being broken away;

FIGURE 2 is a plan of the flotation apparatus of FIGURE 1 showing that it comprises two flotation cells;

FIGURE 3 is a side elevation of the apparatus of FIGURES 1 and 2;

FIGURE 10 is a cross sectional elevation, generally similar to that of FIGURE 8, showing another cross sectional configuration of the rotor that may be used, the rotor being shown in full lines when not under load.

DESCRIPTION OF PREFERRED EMBODIMENTS

Figure 4:
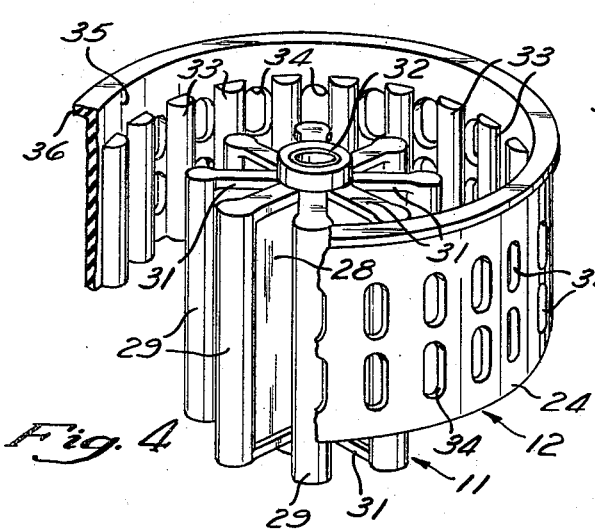
FIGURE 4 is a perspective to an enlarged scale of the rotor and stator means of the apparatus of FIGURES 1 to 3, parts of the stator means being broken away to show the rotor.

The illustrated apparatus comprises two flotation cells 1 and 2. Each comprises a tank 3, formed by side and bottom walls 4 and 5 common to both cells, an end wall 6 or 7 and one side of a partition wall 8. Preferably, each tank has side walls with essentially vertical upper portions 9 and inwardly inclined lower portions 10; end walls 6 and 7 and partition wall 8 preferably are essentially vertical throughout.

Each cell includes a rotor 11 and a stator means 12. The rotor is fixed to the bottom of a shaft 14 and is supported a substantial distance above the bottom wall 5 of tank 3 for rotation about an upright, and preferably essentially vertical, axis A; it is positively rotated through belts 15 and pulleys 16 and 17 by motor 18. The means for rotatably supporting the shaft includes bearing structure 19 fixed to a bracket 20 that also supports motor 18. Bracket 20 is supported from a super-structure 21 and extends over and above the tops of the tanks 3 and above the level L of the liquid in each tank. The upper edge of the side walls of the tank has overflow portions 22 that in known manner may be adjustable as to height to aid in maintaining the level of pulp in the tank 3 at a level L. Similarly, partition 8 may have an adjustable overflow portion in known manner, if desired.

The lower portion of stator means 12 comprises a stator structure 24 surrounding and circumferentially spaced from the rotor 11. The stator structure 24 extends at least to the top of the rotor and preferably, as shown, somewhat above the top of the rotor. The stator structure preferably, as shown, has its bottom located substantially above the bottom of the rotor, and an even greater distance above the bottom wall of the tank. The stator means also includes an upper portion taking the form of a preferably imperforate open-ended standpipe member 25 that supports the stator structure and also forms a conduit for air from above the liquid level L to the interior of the structure 24 at the vicinity of rotor 11. Preferably the stator means also includes a downwardly outwardly flaring perforated hood 26.

The illustrated rotor of FIGURES 1–8 is of generally star-shaped cross sectional configuration. It comprises a relatively inflexible central axially extending portion 27 to which are fixed generally radially and generally axially extending relatively thin vanes 28 having generally axially extending ribs 29 that are spaced from the axis and also project transversely from the vanes. Ribs 29 preferably are located at the ends of the vanes and may as shown be of generally circular cross section except where they join the vanes. Furthermore, the ribs preferably are of substantially uniform cross section throughout their lengths and are generally parallel to the axis of rotation A, so that the outer edges of the ribs define a substantially cylindrical rotor periphery. Preferably, the vanes 28 when unloaded have surfaces that are substantially flat and included in planes generally parallel to the axis of rotation A of the rotor. Moreover, it is preferable that the rotor have at least four such vanes to provide the desired smooth operation and freedom from harmful pulsations in operation. Preferably, as shown in FIGURE 4, each rotor vane also has one or more generally radial ribs 31 preferably at the ends of the vanes, that extend between the central portion 27 and the generally axial ribs 29. Ribs 31 serve to reinforce and strengthen the rotor vanes and also make them of somewhat concave configuration, which is advantageous in operation.

Preferably the length of the rotor is between about 75% to about 125% of the diameter of the rotor since such a proportion makes for greater efficiency in power use and aeration and reduces the cost of the rotor and apparatus by omitting unneeded rotor length; exceptionally advantageous results are obtained when the length of the rotor is essentially equal to its diameter so that the rotor may be termed a "1+1" rotor.

Figure 8:
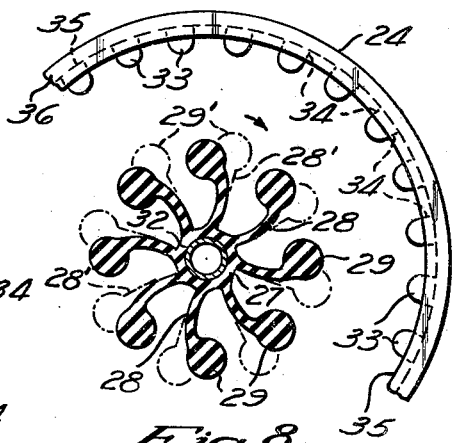
FIGURE 8 is a cross sectional elevation, on the same scale as FIGURE 4, illustrating in full lines how the vanes of the rotor may deflect under load, the positions of the rotor vanes when not under load being shown in broken lines.
Figure 6:
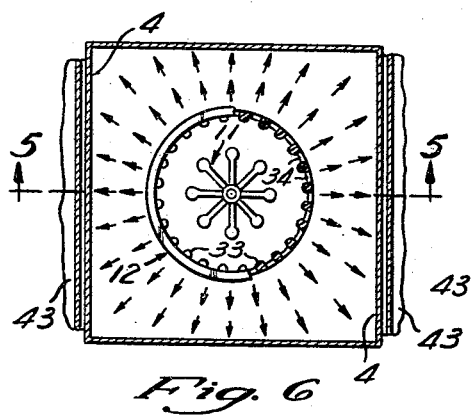
FIGURE 6 is a section along line 6—6 of FIGURE 5 of one of the cells of the apparatus of FIGURES 1 to 3 diagrammatically showing in plan the bubble flow pattern of the operating apparatus.

It is desirable that the vanes 28 be formed so that under conditions of no or light load the vanes do not distort appreciably, but that under substantial load they can distort into generally spiral cross sectional configurations as shown somewhat pronouncedly in FIGURE 8 over at least a portion of the length of the rotor. Preferably the vanes are so formed that under tangential forces resulting from substantial load they can also axially distort as shown to a somewhat greater than actual degree in FIGURE 7, so that the ends of the ribs 29 at the lower ends of the rotor vanes trail the ends of the ribs 29 at the upper ends of the vanes by deflecting rearwardly of the direction of rotation of the rotor by a limited amount.

Preferably the rotor is molded in one piece about a central metal sleeve by which the rotor is non-rotatably mounted on shaft 14. The rotor may be molded of rubber-like material of known type that when solid is sufficiently stiff for structural purposes and sufficiently flexible to deflect as described, and which is abrasion and corrosion resistant.

The illustrated stator structure 24 comprises several circumferentially, preferably equidistantly, spaced generally axially extending, generally parallel upright preferably vertical members 33 projecting from the rotor and preferably equally spaced from the axis of the rotor. Openings 34 for passage of fluid are located between these members 33. Members 33 are substantially closer together circumferentially than are ribs 29 of the rotor; preferably there are at least twice as many members 33 as there are rotor vanes to provide proper aeration and stable bubble flow patterns; exceptionally good results are obtained when there are about three times as many members 33 as rotor vanes. Members 33 preferably are of identical cross section. On each member 33 at least the longitudinal internal edge facing the rotor vanes as they rotate (edge E in FIGURE 8), and preferably both internal longitudinal edges should diverge from the adjacent opening 34 toward the innermost surface of the member 33 to facilitate radial flow of fluid through openings 34. In the illustrated apparatus each member 33 is essentially semicircular in cross section and semi-cylindrical; this is an exceptionally advantageous shape.

While members 33 may be supported in various manners, they are preferably, as shown, molded as internal ribs on the inner surface of a circumferential upstanding preferably vertical wall 35 that surrounds the rotor. Preferably each member 33 projects from the wall by a distance equivalent to from about one quarter to three quarters of the width of the adjacent opening 34. The openings 34 in the walls are preferably elongated as shown. In the illustrated apparatus, wall 35 has an upper outwardly extending flange 36 (FIGURES 1 and 4) by which it is molded to a lower outwardly extending flange 37 on the standpipe member 25 that is fixed by its upper portion to the superstructure 21 above tank 31. If desired the stator structure may be molded in one piece, as of a corrosion and abrasion resistant material similar to that of the rotor.

In operation of the illustrated apparatus, the pulp or slurry from which particles are to be separated is introduced into the feed box 38 (FIGURES 2 and 3) from the lower portion of which it passes into the lower portion of the tank 3 for the adjacent cell 1. Some of the pulp passes through or over partition 8 in a known manner into the tank of adjacent cell 2; from cell 2 the tailings can pass through the lower portion of end wall 7 to a discharge box 39. Box 39 includes an adjustable weir 40, which in a known manner forms part of the means for maintaining the desired level L of liquid in the tanks.

Figure 5:
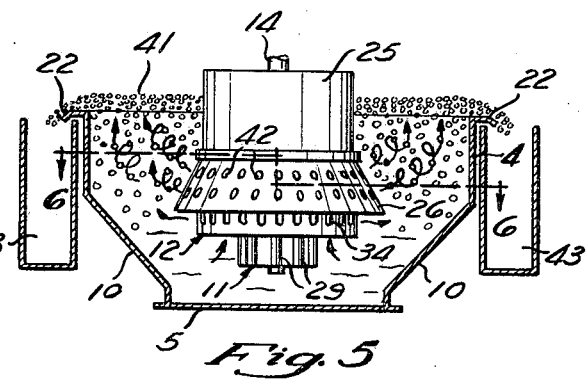
FIGURE 5 is a sectional elevation along line 5—5 of FIGURE 6 diagrammatically showing in a vertical plane the bubble flow pattern in one of the cells when the apparatus is operating.

In each cell, as the rotor 11 is positively rotated at a proper speed by motor 18, the pulp is drawn initially laterally and thence upwardly from the lower portion of tank 3 by the rotor into the stator structure 24, the interior of which constitutes a pulp-air mixing zone. Meanwhile, the rotor 11 draws air downwardly inside of the standpipe member 25 from above the level L of the pulp in the tank and into the stator structure 24. Both the pulp and the air are drawn into the spaces between the vanes of the rotor and into the rotor structure and there mixed. Substantial centrifugal forces generated by the rotating rotor propel the pulp-air mixture generally radially toward the inner surface of the stator, and then through the openings 34 in the stator structure. The members 33 of the stator act to guide the mixture into, and aid in discharging it through, openings 34. The shearing action of these openings on the pulp-air mixture breaks larger masses of air in the mixture into many small bubbles. The bubbles flow from the circumferentially spaced openings 34 in the stator structure in stable, distinct, individual, generally radial pathways indicated by the arrows shown in FIGURE 6. Within these generally radial pathways, individual whorls form and move radially outward; in these whorls the bubbles travel in individual cyclonic or helical paths about generally upwardly directed axes to the top of the body of pulp, as diagrammatically illustrated in FIGURE 5. For clearness, this figure shows only a few of the bubbles and whorls; in actual practice substantially the entire horizontal cross sections of the body of pulp outside of the stator structure is filled with cyclonic whorls of bubbles moving upwardly to the frothing zone 41 (FIGURE 5) at the top of the body of pulp in the tank. As the bubbles in the whorls travel through their extended paths in the tank, particles of suitable surface characteristics that are suspended in the liquid, particularly with the aid of the agitation provided by the lower projecting portion of the rotating rotor, become attached to the bubbles and are carried upwardly to the frothing zone 41. From this zone the particle-carrying bubbles, as shown in FIGURE 5, overflow the tank sidewall portions 22 into the launders or troughs 43 to carry the separated particles and overflow liquid away.

This flow pattern carries the bubbles and their associated particles laterally from the stator structure toward all portions of the tank periphery. The bubbles can readily discharge over the portions 22. Furthermore, the flow pattern, which provides greatly increased exposures of the bubbles to the finely divided particles in the pulp that are to be contacted and adhered to the bubbles, is extremely stable; it can render unnecessary the radially extending swirl baffles that are commonly used in prior flotation aeration apparatus to prevent the swirling of the pulp and the bubbles around the outside of the stator that tends to occur because of the interaction of the rotor and stator in such prior apparatus.

This flow pattern of radially traveling cyclonic whorls of bubbles in the pulp differs widely from the flow patterns produced by prior flotation apparatus, and aids in making possible adequate flotation at rotor speeds considerably lower than required in prior flotation apparatus or increased flotation at conventional rotor speeds.

Preferably, the maximum diameter of the exterior of the rotor when unloaded is between about 50% and about 70% of the minimum interior diameter of the stator structure, to provide an annular clearance between the rotor and stator that is considerably larger than in prior aeration flotation apparatus. This large clearance is important in causing efficient aeration and the formation of the stable generally radial flow pattern described above; it also minimizes or completely eliminates possibilities of jamming of the rotor and the stator structure, with consequent possibilities of breakage of parts of loss of production as can occur in prior machines having close clearances between the stator and rotor, from excessively large particles or debris that may be in the pulp. It reduces wear and maintenance requirements.

Furthermore, in the apparatus embodying the invention, from about 20% to about 60% of the length of the rotor projects below the stator means; this substantial projection of the rotor makes possible the desired efficient flow of pulp from the tank into the stator structure, intermixing of pulp and the air in the stator structure, and consequent effective forcing of the pulp-air mixture radially outwardly through the openings 34.

Openings 42 through hood 26 can also aid in the above described action, and can also cause an increased path of travel of the bubbles through the path; the hood can also reduce turbulence at the frothing zone 41 that can occur with certain pulps. In many cases, however, the hood 26 can be omitted with no impairment of the above described flow pattern or benefits.

The generally transversely projecting generally axially extending rib portions 29 are important to strengthen and stiffen the ends of the vanes 28 and to prevent fluttering of the vane edges that might otherwise occur with consequent detrimental vibrations and impairment of aeration; to provide added material at the ends of the vanes to resist wear at a location where wear in general is the greatest from the abrasion of the particles in the pulp; to provide added mass that aids the rotor in generating the centrifugal forces that project the pulp-air mixture radially; and also, by the transverse projection of portions 29 in cooperation with the generally axially extending members 33 of the stator, to aid in providing above indicated operation of causing the pulp-air mixture to flow through the openings 34 and essentially radial stable flow patterns of the kind described.

The essentially axial members 33 of the stator, in addition to aiding in delineating the openings 34 and guiding the air-pulp mixture expelled by the stator through such openings; play an important part in forming the above indicated flow pattern and stabilizing it, so that the desired improved aeration and frothing occurs.

The arrangement of the preferably imperforate vanes 28 in the generally star-shaped cross sectional configuration in the rotor prevents the pulp-air mixture from swirling internally of the rotor relative to the rotor; such swirling could cause decreased efficiency due to increased slippage and friction losses, and less propulsive forces on the air-pulp mixture that is driven radially by the rotor. Such swirling inside of the rotor also could cause additional wear on the rotor parts.

The design of the rotor, when it is formed of suitably flexible material, is such that under heavy loads the rotor vanes distort over at least part of the length of the rotor so that they assume essentially spiral cross sectional configurations and the outside diameter of the rotor is correspondingly decreased. This is shown in FIGURE 8 in which the spiral configurations are somewhat exaggerated for the sake of illustration, and in which the portions of the vanes and ribs when not under load are shown in broken lines at 28' and 29'. While under some conditions such vane distortions can occur throughout the axial length of the rotor, as on starting up or thereafter rotating under a relatively heavy load that is substantially uniform throughout the length of the rotor, more usually they occur to the greatest extent in only the lower portion of the rotor where the load is greater because there is little if any air in the fluid that is being moved by the rotor. Such deflection or distortion of the vanes at the lower end of the rotor rather than at the upper end of the rotor can occur on starting up of the rotor when particles have settled or become congested in the lower portion of the tank, or even when there has been no appreciable localized congestion if the pulp density and rotor speeds are such as to impose substantially greater tangential forces on the lower portion of the rotor than elsewhere.

Figure 7:
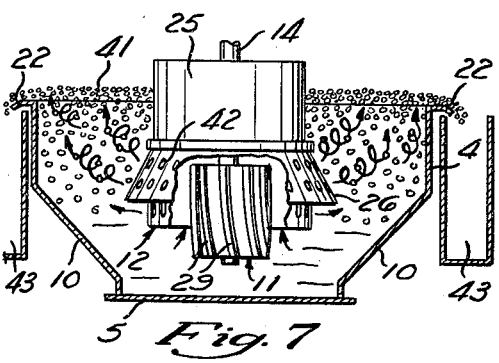
FIGURE 7 is a diagrammatic sectional elevation generally corresponding to FIGURE 5 illustrating deflection of the lower portions of the vanes of the rotor under load.

When the lower portion of the vanes of the illustrated rotor so distort more than the upper portions, the rotor vanes and their generally axial ribs 29 may assume essentially helical configurations axially of the rotor and the diameter of the rotor may decrease appreciably particularly at the lower end of the rotor as shown in FIGURE 7, in which the helical configurations are somewhat exaggerated for the purpose of illustration.

After the rotor has fully started up to operating speed, the distortion or twist of the lower portion of the rotor may be decreased appreciably but in general, while the rotor rotates and is under operating load, the vanes are of somewhat spiral cross sectional configurations throughout their lengths with the greater distortion at the lower end, and the ribs 29 are of generally helical configurations with a greater distortion at the lower end of the rotor, so that the shape of the rotor is similar to that shown in FIGURES 7 and 8.

Such deflections of the vanes 28 and ribs 29 of the rotor to the above indicated configurations under start up or other larger than normal loads or under shocks, reduce shocks or stresses in the rotor and associated parts, reduce possibilities of damage to the apparatus, reduce start up requirements, and reduce wear on the vanes and their ribs particularly if substantial particle congestion is present.

When the lower portions of the rotor vanes and ribs 29 have generally helical configurations whereas the upper portions have little or no helical configurations, such shape of the rotor largely if not completely prevents flooding of the rotor by the pulp, since the trailing lower portions of the vanes and their ribs are somewhat less effective in drawing pulp into the rotor and stator than the substantially straight upper portions of the rotor vanes and ribs are effective in drawing air into the rotor and stator. Consequently such a shape of rotor can preferentially draw air into the rotor and stator; this prevents flooding and makes possible inceased aeration and froth formation.

Figure 9:
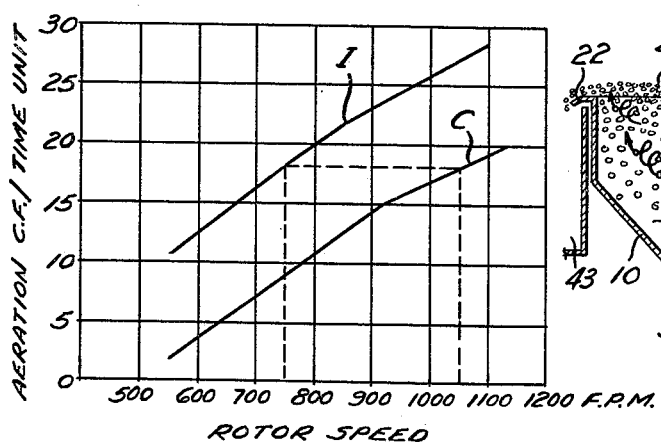
FIGURE 9 is a graph depicting the efficiency of apparatus of the invention as compared to prior apparatus.

All of the above factors cooperate to provide substantially increased efficiency and improved aeration by apparatus of the present invention, as shown by FIGURE 9.

This figure discloses an aeration curve I of a model of an apparatus embodying the invention in comparison with an aeration curve C of a model of a widely used conventional flotation apparatus hitherto considered to be one of the most efficient designs, the diameter of the rotor being the same in both cases. From comparison of the curves it is apparent that according to the invention, at the same rotor speed very considerably more aeration is obtained, and that the same amount of aeration can be obtained at a considerably lower rotor speed.

Various modifications may be made in the apparatus illustrated. Thus the rotor may have more or less vanes than shown. The ribs at the ends of the rotor vanes may have cross sectional configurations other than circular, such as triangular, square, rectangular, hexagonal, oval or other polygonic or curved cross sectional shapes. The cross sectional configuration of the ribs may, for example, be as shown in FIGURE 10, in which the rotor 11a is in all respects similar to the rotor 11 of the previous embodiment and except that the ribs 29a are of generally elongated triangular cross section except where joined at the base of the base of the triangles to the vanes 28. This cross sectional configuration makes possible even more effective movement of pulp and air into the stator and forcing of the pulp-air mixture through the stator structure openings, as well as increased resistance to wear and greater ease in fabrication. Moreover, this shape is such that loss of material due to wear at the extreme outer edges of the ribs 29a reduces the diameter of the rotor much less than in a design, such as the first embodiment, where there is less material at the extreme outer edges. If otherwise the same, the rotor acts the same as that of the preceding embodiment insofar as assuming generally spiral shapes of vanes in cross section and generally helical deflection of the ribs axially under load, particularly at the lower end of the rotor.

The projections represented by the members 33 on the inside of the stator structure may also be more or less numerous than shown in the illustrated embodiments, and have shapes other than the illustrated semicircular shapes, such as square or rectangular, hexagonal, oval or other polygonic or curved shapes, or even may have their effective divergent edges formed of sheet metal. These members may be supported otherwise than illustrated.

Furthermore, if desired, the rotor may be formed so that even when it is not under load the vanes and their ribs corresponding to the ribs 28 or 28a of the illustrated embodiments have a generally helical configuration as illustrated in FIGURE 7 either throughout their length or primarily at one end only, or so that the vanes have a generally spiral configuration as illustrated in FIGURE 8 either throughout their length or primarily at one end only, or so that the vanes are generally spiral in configuration and the ribs are of generally helical configuration as illustrated by both FIGURES 7 and 8. In such cases, some of the advantages indicated above may be achieved. However, if the rotor is initially made with generally straight vanes that are sufficiently flexible to deflect a limited amount to assume such shapes, this is advantageous since the flexibility makes possible shock absorbing deflections that can prolong the life of the rotor and other portions of the apparatus, permit the rotor to assume more efficient shapes under varying loads or speeds, and also make it possible for the rotor readily to be turned end-for-end to equalize wear without discarding the rotor. When the rotor is made symmetrical, when unloaded, it can also be used in services where it is rotated in a reverse direction, so that worn leading surfaces are replaced by unworn trailing surfaces.

I claim:

1. Flotation apparatus comprising a tank having a bottom and upstanding wall means; means for maintaining a predetermined level of liquid in said tank; a rotatable rotor mounted in the tank for rotation about a generally vertical axis with the bottom of the rotor adjacent to and spaced from the bottom of the tank, said rotor comprising a central axial portion, a plurality of generally axially extending vanes supported by and extending generally radially of said axial portion, and generally axially extending portions projecting generally transversely of said vanes at locations on said vanes spaced from the axis of said rotor; and stator means supported in said tank with its lower end substantially above the bottoms of said rotor vanes, said stator means comprising a generally upright portion surrounding and spaced from said rotor vanes and said wall means of said tank and comprising a plurality of circumferentially spaced generally upright members, said stator portion having openings between said upright members through which fluid may be driven by said rotor into the space between said upright portion of said stator means and said wall means of tank.

2. The apparatus of claim 1 in which said vanes of said rotor are flexible to permit at least a portion of each of said generally axially extending generally transversely projecting portions on said vanes to deflect rearwardly of the direction of rotation of said rotor for a limited amount when said vanes are subjected to substantial tangential forces.

3. The apparatus of claim 1 in which said rotor is molded of tough resilient material.

4. The apparatus of claim 1 in which said vanes have generally spiral configurations over at least a portion of the lengths of said vanes.

5. The apparatus of claim 1 in which said generally transversely projecting generally axially extending portions on said vanes are of generally helical configurations axially of said portions over at least part of the lengths of said portions.

6. The apparatus of claim 1 in which said transversely projecting generally axially extending portions on said vanes are generally circular in cross section.

7. The apparatus of claim 1 in which said transversely projecting generally axially extending portions on said vanes are generally triangular in cross section.

8. The apparatus of claim 2 in which said vanes deflect to assume generally spiral configurations over at least part of the lengths of said vanes.

9. The apparatus of claim 2 in which said generally transversely projecting generally axially extending portions on said vanes deflect to assume generally helical configurations axially of said portions over at least part of the length of said portions.

10. The apparatus of claim 1 in which said upright portion of stator means comprises a generally upright wall surrounding and spaced from said rotor and having on its side facing said rotor a plurality of circumferentially spaced generally upright members projecting inwardly toward said rotor and having openings between said members through which fluid may be driven by said rotor into the space between said upright portion of said stator means and said wall means of said tank.

11. The apparatus of claim 10 in which said stator means portion is of molded construction.

12. The apparatus of claim 10 in which said upright members are generally circular in cross section.

13. Flotation apparatus comprising a tank having a bottom and upstanding wall means; means for maintaining a predetermined level of liquid in said tank; a rotatable rotor mounted in the tank for rotation about a generally upright axis with the bottom of the rotor adjacent to and spaced from the bottom of the tank, said rotor comprising a central axial portion and a plurality of generally axially extending vanes supported by and extending generally radially of said axial portion; and stator means supported in said tank with its lower end substantially above the bottoms of said rotor vanes, said stator means comprising a portion having a generally upright wall surrounding and spaced from said rotor vanes and said wall means of said tank and having on its side facing said rotor a plurality of circumferentially spaced generally upright members projecting inwardly toward said rotor and having openings through said wall between said upright members through which fluid may be driven by said rotor into said space between said upright portion of said stator means and said wall means of said tank.

14. The apparatus of claim 13 in which said stator means portion is of molded construction.

15. The apparatus of claim 13 in which said upright members and said openings of said stator means portion extend above said rotor.

16. The apparatus of claim 13 in which said upright members are generally semi-circular in cross section.

17. The method of separating particles by flotation from a body of pulp comprising particles suspended in a liquid, which method comprises moving pulp into one end of a zone of generally circular cross section in the body of pulp, moving air into the other end of said zone, forming a mixture of pulp and air at said zone in which the air is dispersed in the pulp in the form of numerous small separate bubbles, and causing bubbles of air to travel through said body of pulp in numerous substantially stable pathways generally radially of said zone, in each of which pathways bubbles of air travel in individual cyclonic paths about generally upwardly directed axes to the top of the body of pulp, while being exposed to particles in the pulp that selectively adhere to the bubbles said paths being individually laterally spaced with respect to each other and said zone of generally circular cross section.

18. The method of claim 17 in which the pulp is moved upwardly into said zone, the air is moved downwardly into said zone, and the pulp and air mixture is moved laterally from said zone.

19. The apparatus of claim 1 in which the length of said rotor is between about 75% to about 125% of the diameter of the rotor.

20. The apparatus of claim 19 in which the length of the rotor is essentially equal to its diameter.

21. The apparatus of claim 19 in which from about 20% to about 60% of the length of the rotor projects below said stator means.

22. The apparatus of claim 19 in which the maximum diameter of the exterior of the rotor is between about 50% and about 70% of the minimum interior diameter of the stator means portion surrounding the rotor.

23. The apparatus of claim 13 in which the length of the rotor is between about 75% to about 125% of the diameter of the rotor, in which from about 20% to about 60% of the length of the rotor projects below said stator means, and in which the maximum diameter of the rotor is between about 50% to about 70% of the minimum interior diameter of the stator means portion surrounding the rotor.

24. The apparatus of claim 13 in which there are at least twice as many of said upright members on said stator means as there are vanes on said rotor, and in which each of said upright members projects from said wall of said stataor means toward said rotor by a distance equivalent to from about ¼ to about ¾ of the width of the adjacent opening.

25. Floation apparatus comprising a tank having a bottom and upstanding wall means; means for maintaining a predetermined level of liquid in said tank; a rotatable rotor mounted in the tank for rotation about a generally vertical axis with the bottom of the rotor adjacent to and spaced from the bottom of the tank, said rotor comprising a central axial portion, a plurality of generally axially extending vanes supported by and extending generally radially of said axial portion, and generally axially extending portions projecting generally transversely of said vanes at locations on said vanes spaced from the axis of said rotor, said rotor being formed of tough resilient material and having vanes which are flexible to permit at least a portion of each of said vanes and said generally axially extending generally transversely projecting portions on said vanes to deflect rearwardly of the direction of rotation of said rotor for a limited amount when said vanes are subjected to substantial tangential forces, the length of said rotor being between about 75% to about 125% of the diameter of the rotor; and stator means supported in said tank with its lower end substantially above the bottoms of said rotor vanes and with its upper end extending above the level of liquid in said tank, said stator means comprising a generally upright portion having a generally upright wall surrounding and spaced from said rotor and said wall means of said tank and having on its side facing said rotor a plurality of circumferentially spaced generally upright members projecting inwardly towards said rotor and having openings through said wall between said members through which said fluid may be driven by said rotor into the space between said upright portions of said stator and said wall means of said tank, there being at least twice as many of said upright members as there are rotor vanes, the maximum diameter of the exterior of said rotor being between about 50% to about 70% of the minimum interior diameter of said stator means, and from about 20% to about 60% of the length of said rotor projecting below said stator means.

26. The apparatus of claim 25 in which there are about three times as many of said upright members on said stator means as there are vanes on said rotor, and each of said upright members projects from said wall of said stator means towards said rotor by a distance of from about ¼ to about ¾ of the width of the adjacent opening.

References Cited

UNITED STATES PATENTS

| | | | |
|---|---|---|---|
| 1,761,136 | 6/1930 | Lord | 261—93 X |
| 2,074,403 | 3/1937 | Kraut | 209—169 |
| 2,217,231 | 10/1940 | Morse | 261—87 |
| 2,827,015 | 10/1950 | Luota | 261—91 |
| 2,875,897 | 3/1959 | Booty | 209—169 |
| 2,966,266 | 12/1960 | Coke | 209—168 |
| 3,378,141 | 4/1968 | Warman | 209—169 |
| 3,409,130 | 11/1968 | Nakamura | 209—169 |

FOREIGN PATENTS

| | | |
|---|---|---|
| 471,683 | 9/1937 | Great Britain. |
| 658,458 | 2/1963 | Canada. |

HARRY R. THORNTON, Primary Examiner

R. HALPER, Assistant Examiner

U.S. Cl. X.R.

209—169; 210—44, 221; 261—87